United States Patent
Blanchard et al.

(10) Patent No.: US 9,045,705 B2
(45) Date of Patent: Jun. 2, 2015

(54) SYSTEMS AND METHODS FOR COOLING GASIFICATION PRODUCTS

(75) Inventors: Ryan Blanchard, Niskayuna, NY (US); Gregory Michael Laskowski, Saratoga Springs, NY (US)

(73) Assignee: General Electric Company, Niskayuna, NY (US)

(*) Notice: Subject to any disclaimer, the term of this patent is extended or adjusted under 35 U.S.C. 154(b) by 1069 days.

(21) Appl. No.: 13/098,230

(22) Filed: Apr. 29, 2011

(65) Prior Publication Data
US 2012/0273175 A1    Nov. 1, 2012

(51) Int. Cl.
| | |
|---|---|
| C10J 3/48 | (2006.01) |
| C10J 3/56 | (2006.01) |
| C10J 3/52 | (2006.01) |
| C10K 1/04 | (2006.01) |
| C10J 3/86 | (2006.01) |
| F28F 9/02 | (2006.01) |
| F28D 7/16 | (2006.01) |
| F28D 21/00 | (2006.01) |

(52) U.S. Cl.
CPC . *C10J 3/526* (2013.01); *C10K 1/04* (2013.01); *C10J 2300/0959* (2013.01); *C10J 2300/1653* (2013.01); *C10J 2300/1678* (2013.01); *C10J 2300/169* (2013.01); *Y02E 20/18* (2013.01); *C10J 3/485* (2013.01); *C10J 3/86* (2013.01); *C10J 2300/1884* (2013.01); *F28F 9/0263* (2013.01); *F28D 7/16* (2013.01); *F28D 2021/0059* (2013.01); *Y02E 20/16* (2013.01)

(58) Field of Classification Search
USPC ......... 122/7 R; 165/134.1, 135, 84, 157, 172; 48/197 R
See application file for complete search history.

(56) References Cited

U.S. PATENT DOCUMENTS

| | | | |
|---|---|---|---|
| 4,312,637 A | 1/1982 | Loftus | |
| 4,377,394 A | 3/1983 | Muenger et al. | |
| 4,574,002 A | 3/1986 | Barot | |
| 6,960,234 B2* | 11/2005 | Hassett | 48/77 |
| 8,398,730 B2* | 3/2013 | Wallace et al. | 48/76 |
| 8,597,384 B2* | 12/2013 | Abbasi et al. | 48/119 |
| 2007/0119577 A1* | 5/2007 | Kraft et al. | 165/157 |
| 2008/0041572 A1* | 2/2008 | Wessel et al. | 165/157 |
| 2008/0172941 A1* | 7/2008 | Jancker et al. | 48/73 |
| 2009/0047193 A1* | 2/2009 | Corry et al. | 422/200 |
| 2010/0175321 A1* | 7/2010 | Harned et al. | 48/87 |
| 2011/0072720 A1* | 3/2011 | Abbasi et al. | 48/87 |
| 2012/0181355 A1* | 7/2012 | Corry et al. | 239/436 |
| 2014/0026484 A1* | 1/2014 | Wallace et al. | 48/197 R |

FOREIGN PATENT DOCUMENTS

| | | |
|---|---|---|
| CN | 1923975 A | 3/2007 |
| JP | 2003090531 A | 3/2003 |

OTHER PUBLICATIONS

Unofficial English translated Chinese Office Action and Search Report issued in connection with corresponding Chinese Application No. 201210143424.4 dated Sep. 1, 2014.

* cited by examiner

*Primary Examiner* — Gregory A Wilson
(74) *Attorney, Agent, or Firm* — Ann M. Agosti (57) ABSTRACT

Gasification cooling systems provided herein may include a housing having a fluid passage extending in a flow direction lengthwise along the housing and an annular wall disposed about the fluid passage and having one or more annular steps. Such systems may also include a plurality of heat exchanger tubes downstream of the one or more annular steps and adapted to cool a syngas in the gas passage as the syngas flows in the flow direction.

19 Claims, 5 Drawing Sheets

SYSTEMS AND METHODS FOR COOLING GASIFICATION PRODUCTS

BACKGROUND OF THE INVENTION

The subject matter disclosed herein relates to gasification cooling systems, such as radiant syngas coolers, which cool gas from a gasifier.

Integrated gasification combined cycle (IGCC) power plants are capable of generating energy from various hydrocarbon feedstock, such as coal, relatively cleanly and efficiently. IGCC technology may convert the hydrocarbon feedstock into a gas mixture including carbon monoxide (CO) and hydrogen ($H_2$), e.g., syngas, by reaction with steam in a gasifier. These gases may be cooled, cleaned, and utilized as fuel in a conventional combined cycle power plant. For example, a radiant syngas cooler (RSC) may receive and cool the syngas upstream from a water gas shift reactor and/or other gas cleaning units. Unfortunately, the incorporation of slag in the syngas entering a throat of the RSC can potentially damage heat exchanger tubing without sufficient separation of the slag from the syngas. Furthermore, current approaches for separating the slag from the syngas before the syngas reaches the heat exchanger tubing, for example, by limiting the diameter of the throat, may increase the velocity of the syngas flow through the RSC, which complicates the design for optimal syngas cooling via heat exchange in the RSC.

BRIEF DESCRIPTION OF THE INVENTION

In one embodiment, a gasification cooling system includes a housing having an inlet, an outlet, and an interior region disposed between the inlet and the outlet. The gasification cooling system also includes a throat disposed in the interior region adjacent the inlet and having an annular wall. The annular wall includes an annular step, a region of constant diameter, and a region of increasing diameter extending in a flow direction from the portion of the throat adjacent the inlet toward the outlet.

In another embodiment, a gasification cooling system includes a housing including a fluid passage extending in a flow direction lengthwise along the housing and an annular wall disposed about the fluid passage and having one or more annular steps. The gasification cooling system also includes a plurality of heat exchanger tubes downstream of the one or more annular steps and adapted to cool a syngas in the gas passage as the syngas flows in the flow direction.

In another embodiment, a gasification cooling system includes a housing having an inlet, an outlet, and a fluid passage disposed between the inlet and the outlet. The gasification cooling system also includes a throat adjacent the inlet and having an annular wall disposed about the fluid passage. Further, the system also includes one or more drip points circumferentially disposed about the annular wall and adapted to separate a high density stream from a mixed density fluid stream flowing in a flow direction from the inlet toward the outlet.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

As described below, provided herein are embodiments of gasification cooling systems that include one or more features enabling separation of a high density flow path (e.g., a slag flow path) from a mixed density flow path (e.g., a slag and syngas mixture) and/or facilitating diffusion of a syngas flow path upstream of heat exchanger tubing. For example, such features may include an annular step configured to function as a drip point that separates a slag stream from a mixture of slag and syngas. For further example, some embodiments may include an annular step and an annular region of constant diameter that cooperate to separate the slag stream from the mixture while facilitating reattachment of a boundary layer to the syngas after the streams are separated in the flow direction through the cooling device. Additionally, some embodiments may include an annular region of increasing diameter that expands in diameter in the flow direction. This feature may enable the diffusion of the separated syngas stream in the flow direction toward heat exchanger tubing configured to cool the diffused syngas stream. The foregoing features may facilitate decoupling of the syngas stream from the slag stream, thus enabling improved transfer of heat from the syngas to the heat exchanger tubing as the syngas flows through the cooling device.

The foregoing features may be disposed in a variety of systems and devices, such as those found in industrial equipment, power plants, or other applications. In the embodiments described herein, the foregoing features are located in a throat region of a radiant syngas cooler (RSC) configured to cool syngas originating from a gasifier in an integrated gasification combined cycle (IGCC) power plant. However, in other embodiments, such features may be located in any suitable region of various gasification cooling systems. The features of the illustrated RSC may be subject to considerable variations in size, shape, and placement based on factors such as the type of gasifier used in the overall process. As such, features such as the annular step may have configurations other than those illustrated that are within the scope of the disclosed annular step.

Figure 1:
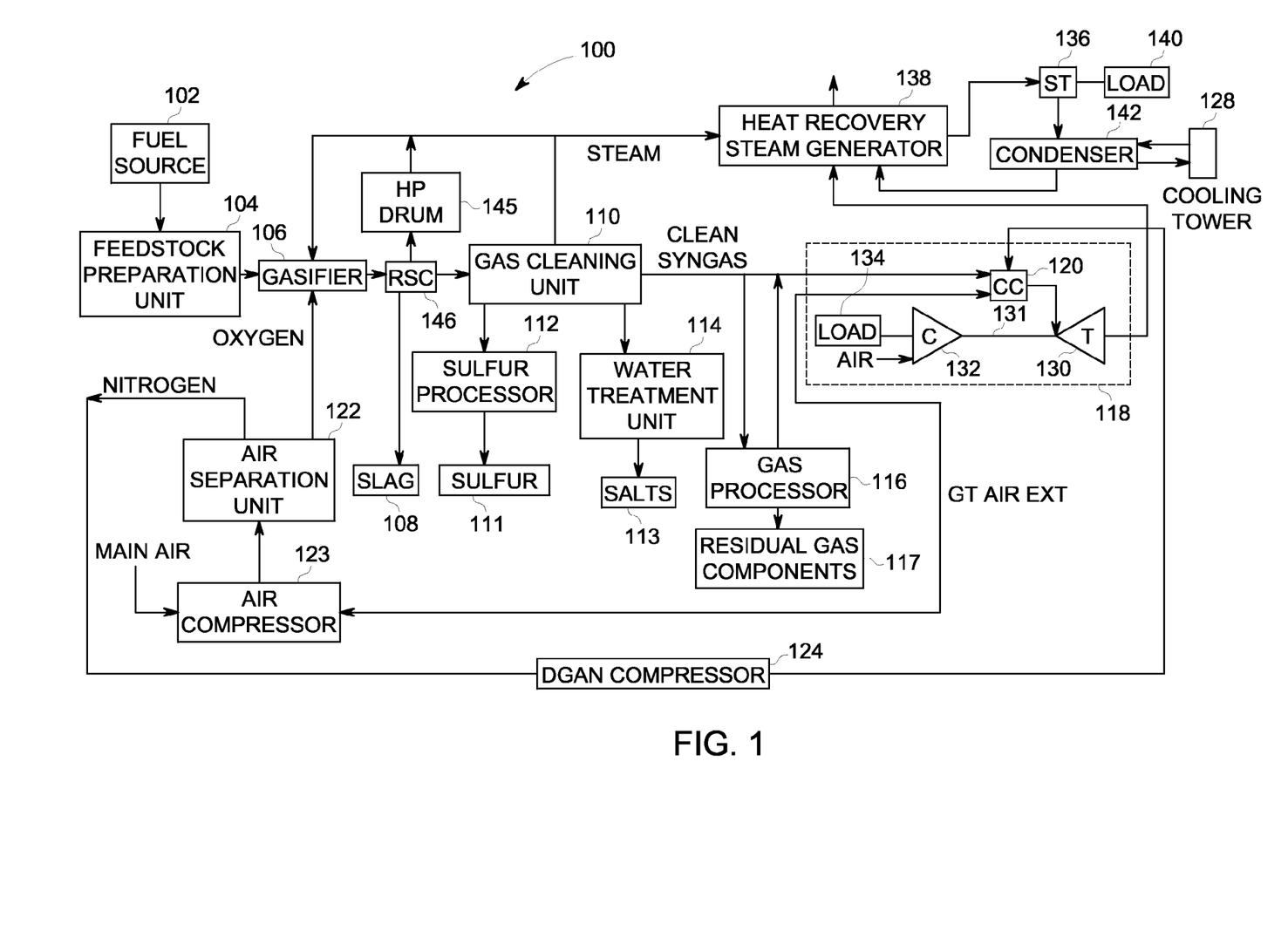
FIG. 1 is a block diagram of an embodiment of an integrated gasification combined cycle (IGCC) power plant including a radiant syngas cooler (RSC)

Turning now to the drawings, FIG. 1 is a diagram of an embodiment of an integrated gasification combined cycle (IGCC) system 100 that may be powered by synthetic gas, i.e., syngas. Elements of the IGCC system 100 may include a fuel source 102, such as a solid feed, that may be utilized as a source of energy for the IGCC. The fuel source 102 may include coal, petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock.

The feedstock may be passed to a gasifier 106 from the feedstock preparation unit 104. The gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius-1600 degrees Celsius, depending on the type of gasifier 106 utilized. The gasification process may include the feedstock undergoing a pyrolysis process, whereby the feedstock is heated. Temperatures inside the gasifier 106 may range from approximately 150 degrees Celsius to 700 degrees Celsius during the pyrolysis process, depending on the fuel source 102 utilized to generate the feedstock. The heating of the feedstock during the pyrolysis process may generate a solid, (e.g., char), and residue gases, (e.g., carbon monoxide, hydrogen, and nitrogen). The char remaining from the feedstock from the pyrolysis process may weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 degrees Celsius to 1600 degrees Celsius. Next, steam may be introduced into the gasifier 106 during a gasification step. The char may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be "burned" to produce carbon monoxide and energy, which drives a second reaction that converts further feedstock to hydrogen and additional carbon dioxide.

In this way, a resultant gas is manufactured by the gasifier 106. This resultant gas may include approximately 85% of carbon monoxide and hydrogen, as well as $CH_4$, HCl, HF, COS, $NH_3$, HCN, and $H_2S$ (based on the sulfur content of the feedstock). This resultant gas may be termed dirty syngas, and, after leaving the gasifier 106, the dirty syngas is typically mixed with waste, such as slag 108, which may be a wet ash material. The dirty syngas and the slag 108 exiting the gasifier 106 are at elevated temperatures, and, to separate and cool the syngas and slag mixture, a radiant syngas cooler (RSC) 146 is employed. The slag and dirty syngas mixture enters the RSC 146 where the slag 108 is separated from the dirty syngas, as illustrated in FIG. 1. The slag 108 may then be removed from the gasifier 106 and disposed of, for example, as road base or as another building material. The dirty syngas, on the other hand, is routed toward heat exchanger tubing of the RSC 146, and fluid flowing through the heat exchanger tubing may act to cool the dirty syngas as it travels through the RSC 146. Accordingly, the fluid flowing through the tubing of the RSC 146 may be at a significantly lower temperature than the dirty syngas flowing through the RSC.

Embodiments of the radiant syngas coolers disclosed herein may include one or more features, such as an annular step, which enable the slag 108 to be separated from the dirty syngas before the dirty syngas is directed toward the exchanger tubing for cooling. Further, features such as a portion of a throat region of the RSC increasing in diameter in the direction of syngas flow may diffuse the syngas around the heat exchanger tubing to enable efficient operation of the heat exchangers. These and other features of certain embodiments of the present invention are discussed in more detail below with respect to the RSC shown in FIG. 2. However, it should be noted that these features may be included in any gasification cooling system and are not limited to radiant syngas coolers.

After the dirty syngas is cooled and separated from the slag 108, a gas cleaning unit 110 may be utilized to clean the dirty syngas. The gas cleaning unit 110 may scrub the dirty syngas to remove the HCl, HF, COS, HCN, and $H_2S$ from the dirty syngas, which may include separation of sulfur 111 in a sulfur processor 112 by, for example, an acid gas removal process in the sulfur processor 112. Furthermore, the gas cleaning unit 110 may separate salts 113 from the dirty syngas via a water treatment unit 114 that may utilize water purification techniques to generate usable salts 113 from the dirty syngas. Subsequently, the gas from the gas cleaning unit 110 may include clean syngas.

If desired, a gas processor 116 may be utilized to remove residual gas components 117 from the clean syngas. However, removal of residual gas components 117 from the clean syngas is optional, since the clean syngas may be utilized as a fuel even when containing the residual gas components 117, e.g., tail gas. At this point, the clean syngas may include approximately 1-10% CO (e.g., 3% CO), approximately 30-60% $H_2$ (e.g., 55% $H_2$), and approximately 30-60% $CO_2$ (e.g., 40% $CO_2$) and is substantially stripped of $H_2S$. This clean syngas may be transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118.

The compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases may force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. Heated exhaust gas from the gas turbine engine 118 may be transported into the HRSG 138 and used to heat water and produce steam used to power the steam turbine engine 136. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
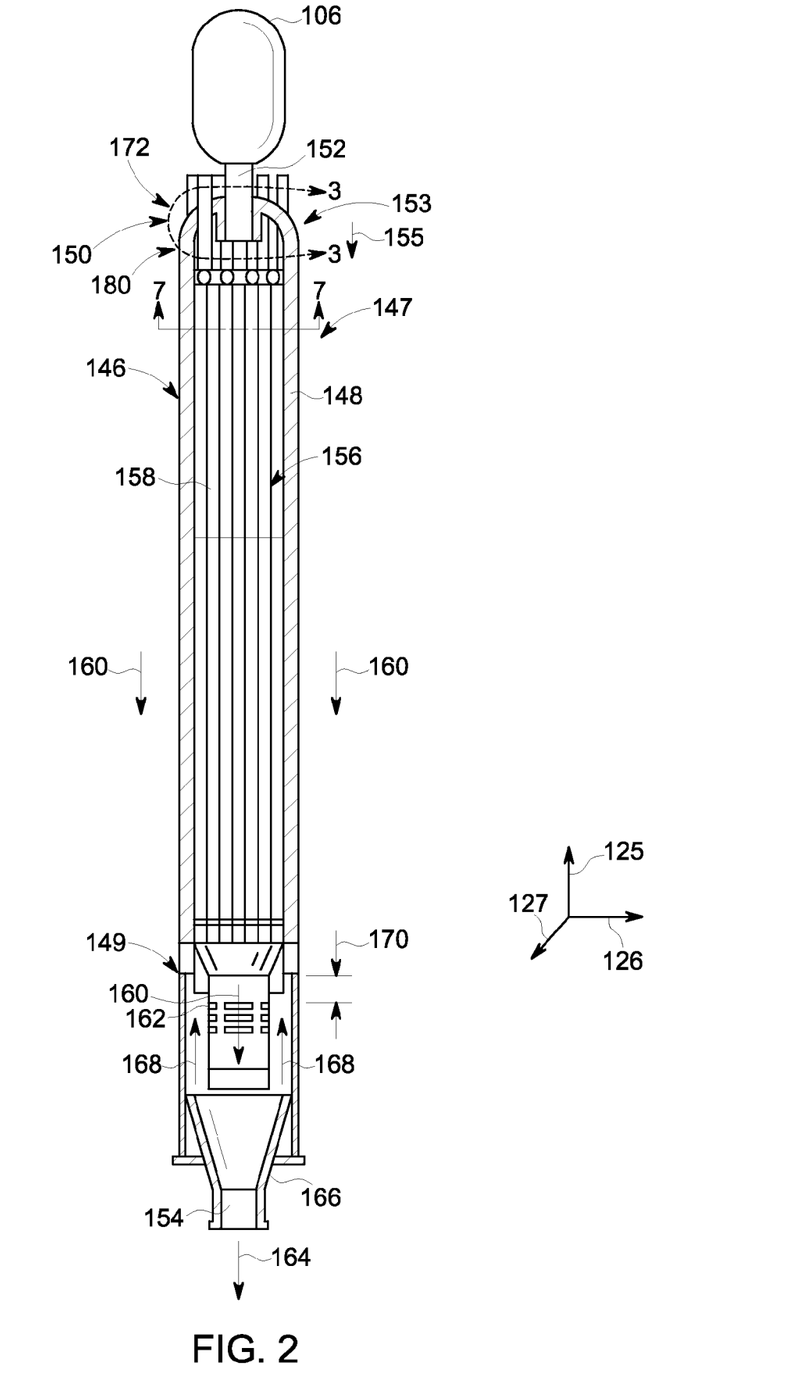
FIG. 2 is a cross-sectional side view of an embodiment of the RSC of FIG. 1.

FIG. 2 is a cross-sectional side view of an embodiment of the radiant syngas cooler 146 utilized in the IGCC system 100 of FIG. 1. The RSC 146 has an axial axis 125, a radial axis 126, and a circumferential axis 127. The RSC 146 may include a vessel 148, which may be made of a suitable material, such as ASTM SA387, grade 11, class 2. The vessel 148 functions as a housing or outer casing for the RSC 146, enclosing both an upper region 147 of the RSC 146 as well as a lower region 149 of the RSC 146. The upper region 147 of the RSC 146 may include a dome-shaped portion 150 that includes an inlet 152 extending into a throat 153. The lower region 149 includes an outlet 154. An interior region 156 is defined by the space between the inlet 152 and the outlet 154. The throat 153, which is adjacent the inlet 152, expands in a downstream direction 155 from the inlet 152 toward the outlet 154.

The illustrated vessel 148 also includes heat exchanger tubing 158, which may be in the upper region 147 of the RSC 146. The tubing 158 may include a plurality of conduits disposed along the radial axis 126 of the RSC 146 and running parallel in direction with the vessel 148 relative to the axial axis 125. Chilled liquid, such as water, may flow through the tubing 158. Thus, during use, the tubing 158 may act as a heat exchanger within the RSC 146, and may circulate the coolant to an external heat exchanger for removal of heat. That is, a chilled liquid may be circulated through the tubing 158 and heated up as the hot syngas contacts the outer surfaces of the heat exchanger tubing 158. As such, the liquid flowing through the heat exchanger tubing 158 may enter the tubing at a lower temperature than the liquid leaving the tubing 158. Accordingly, the tubing 158 may be made of a thermally resistant material suitable for use with hot syngas.

During operation, the syngas generated in the gasifier 106 enters the RSC 146 as a mixture of syngas and slag. As described in more detail below with respect to FIG. 3, the slag 108 and the syngas are separated from the syngas and slag mixture in the throat region 153 of the RSC 146 and, after separation, follow distinct flow paths through the remainder of the length of the RSC 146. The syngas, after being separated from the slag flow stream, generally flows in a downward manner parallel to the tubing 158 as indicated by arrows 160. That is, the syngas flows through a gas passage of the RSC 146 that extends in the flow direction 160 lengthwise along the vessel 148. Accordingly, the syngas enters the RSC 146 through the inlet 152 in a mixture with the slag, separates from the slag, flows lengthwise through the interior region 156 of the RSC 146, and then exits the RSC 146 through the outlet 154. In this manner, the syngas may come in contact with the tubing 158 of the RSC 146 and the fluid flowing through the tubing 158 may act to cool the syngas as it travels through the RSC 146. One result of this cooling process may be the generation of steam in the tubing 158, which may, for example, be transmitted to the high pressure drum 145 (see FIG. 1) for collection and transmission to the heat recovery steam generator 138.

The RSC 146 may also include a conduit 162 in the lower region 149 of the RSC 146 that may aid in directing the cooled syngas and separated slag out of the RSC 146. For example, as the slag 108 exits the conduit 162, the slag 108 may flow in a generally downward direction 164 to exit the RSC 146 via a quench cone 166. In contrast, the cooled syngas may flow in a general upward direction 168 towards a transfer line 170 as the syngas exits the conduit 162. The transfer line 170 may be used to transmit the syngas to the gas cleaning unit 110 and/or the gas turbine engine 118 (see FIG. 1). The raw syngas may corrode elements of the RSC 146, such as the tubing 158 and/or the inner wall of the vessel 148, if these elements were to come into contact with the syngas. Accordingly, in certain embodiments, a gas inlet 172 may transmit a non-corrosive fluid, such as a shielding gas 180 (e.g., nitrogen), to the RSC 146. This non-corrosive fluid may flow generally downward between the vessel 148 and the tubing 158 of RSC 146 to form a protective barrier, for example, against syngas migration into the annular space between the tubes 158 and the vessel 148.

As will be described in more detail below with respect to FIGS. 3-6, the dome shaped portion 150 of the upper region 147 of the RSC 146 encloses the throat region 153 having one or more unique features and/or regions, such as an annular step, a region of constant diameter, and a region of increasing diameter. The annular step of certain embodiments is configured to separate the slag from the slag and syngas mixture entering the RSC. The region of constant diameter, when positioned directly below the annular step in the direction of fluid flow, is configured to enable a boundary layer of the syngas to reattach to the syngas flow stream after removal of the slag. Still further, the region of increasing diameter, when disposed in the throat region below the region of constant diameter in the flow direction, diffuses the syngas flow path about the downstream heat exchanger tubing to facilitate the efficient cooling of the syngas. This diffusion of the syngas may reduce the velocity of the syngas flow in the downstream direction before the syngas reaches the heat exchanger tubing, thus increasing the travel time of the syngas along the length of the heat exchangers and enabling improved heat transfer.

Figure 3:
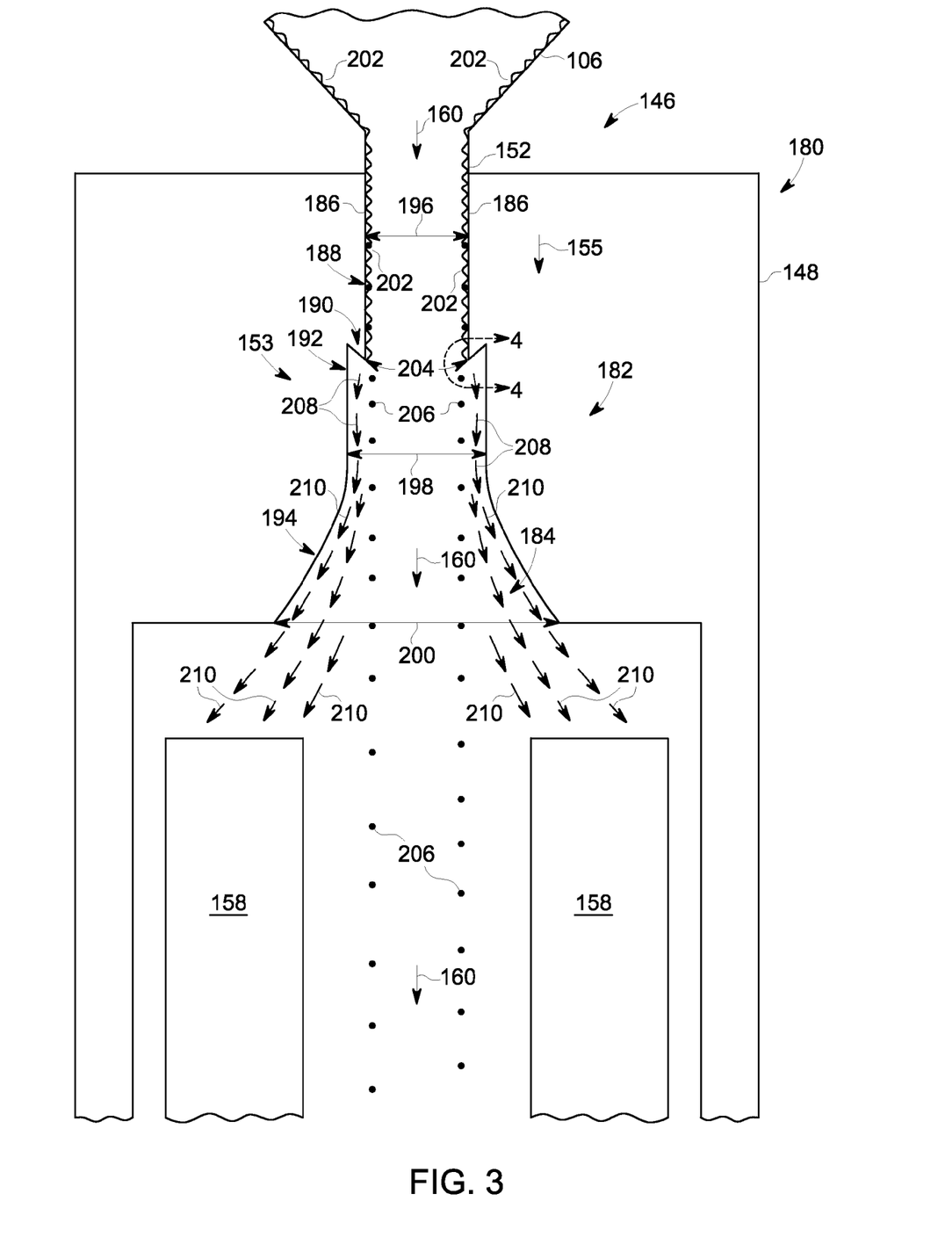
FIG. 3 is a partial cross-sectional view of the RSC of FIG. 2, illustrating an embodiment of a throat region of the RSC as shown within line 3-3 of FIG. 2.

FIG. 3 is a partial cross-sectional view of the RSC 146 taken within line 3-3 of FIG. 2, illustrating thermal and mechanical features located in the dome-shaped portion 150 of the upper region 147 of the RSC 146. The vessel housing 148 separates an exterior environment 180 from an interior of the RSC 146. The illustrated portion of the interior of the RSC 146 includes the throat region 153 having a dome chamber 182 and an interior chamber 184 (e.g., central volume or syngas passage) separated by an interior annular wall assembly 186. In certain embodiments, the annular wall assembly 186 may be made of a suitable refractory system configured to thermally block heat transfer from the hot syngas flowing through the interior chamber 184 to the outer chamber 182. To that end, some embodiments may include a plurality of refractory bricks and/or insulative layers with suitable properties, such as thermal shielding capabilities, sealing functionality (e.g., to block leakage of hot syngas from the interior chamber 184 to the dome chamber 182), and so forth.

In the illustrated embodiment, the annular wall assembly 186 includes a top portion 188, an annular step 190, a region of substantially constant diameter 192, and a region of increasing diameter 194. As shown, the annular step 190 is disposed upstream of the constant diameter region 192 that is disposed upstream of the tapered region 194. Such a placement of the annular step 190 with respect to the regions 192 and 194 may enable separation of the slag from the slag and syngas mixture and, subsequently, diffusion of the syngas as the syngas travels through the RSC 146 in the flow direction indicated by arrows 160.

As shown, the top portion 188 of the annular wall 186 is defined by a first diameter 196 that is substantially constant along the axial length of the top portion 188. The first diameter 196 defines the circumference of the annular wall 186 until the annular step 190 upticks, thereby increasing the wall diameter to a second diameter 198 greater than the first diameter 196. This region 192 of constant diameter gradually flares outward from the second diameter 198 to a third diameter 200 at a base of the throat region 153. As such, the region 194 forms a flared portion of the annular wall assembly 186. Downstream of the flared portion 194 of the throat region 153 of the RSC 146, the plurality of heat exchanger tubes 158 is arranged. In the illustrated embodiment, two heat exchanger tubes 158 are shown near the vessel perimeter. However, the quantity and placement of these heat exchanger tubes is chosen for illustrative purposes, not meant to limit the invention to this configuration or quantity. Indeed, in presently contemplated embodiments, many heat exchanger tubes are arranged about the entire circumference of the vessel of the RSC 146.

During operation, a mixture 202 of a high density fluid (e.g., slag) and a low density fluid (e.g., dirty syngas) enters the inlet 152 of the RSC 146 and flows downstream in the flow direction indicated by arrows 160. The mixture 202 follows the path defined by the region 188 of constant diameter of the annular wall assembly 186. When the mixture 202 reaches drip point 204 of the annular step 190 portion of the annular wall assembly 186, a high density portion 206 of the mixture 202 is separated from a low density portion of the mixture 202. For example, in one embodiment, the drip point 204 of the annular step 190 may separate slag from a slag and syngas mixture. As such, the high density flow path of high density material flowing downstream is established in a columnar path substantially defined by diameter 196. Accordingly, in some embodiments, the diameter 196 may be dimensioned to optimize or minimize the diameter of the falling column of high density material (e.g., slag) as desired for the given application. For example, the diameter 196 may be chosen such that the volume of the vessel 146 occupied by the slag column is reduced or minimized, thus enabling the devotion of more of the volume of the interior 184 to heat exchanger tubing. The foregoing feature may offer distinct advantages because a greater volume of heat exchanger tubing may facilitate efficient heat transfer.

When the high density flow path 206 is separated from the mixture 202, a low density component (e.g., syngas) establishes a separate flow path through the region 192 of the throat 153, as shown by arrows 208. In some embodiments, during separation of the high density component 206 from the mixture 202, a boundary layer of the syngas (i.e., the low density component) may also be separated from the mixture, thus generating a slag flow path, a boundary layer, and a syngas flow path. In such embodiments, the region 192 of constant diameter may enable the boundary layer to reattach to the syngas before the syngas is diffused by the tapered region 194, as shown by arrows 210. The diffused syngas 210 flows downstream toward the heat exchanger tubing 158. As the syngas travels through the RSC 146, heat is exchanged between the hot syngas and the chilled coolant running through the heat exchanger tubes, thus cooling the syngas, as described in detail above with respect to FIG. 2.

Figure 4:
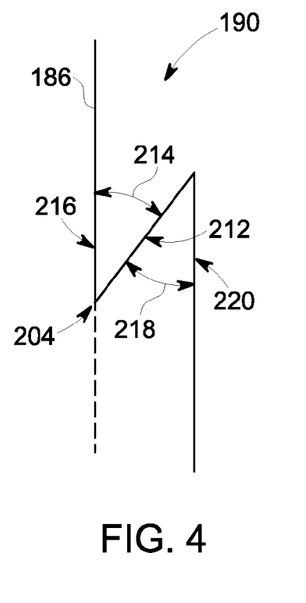
FIG. 4 is a partial cross-sectional view of the RSC of FIG. 3, illustrating an embodiment of an annular step of the RSC throat as shown within line 4-4 of FIG. 3.
Figure 5:
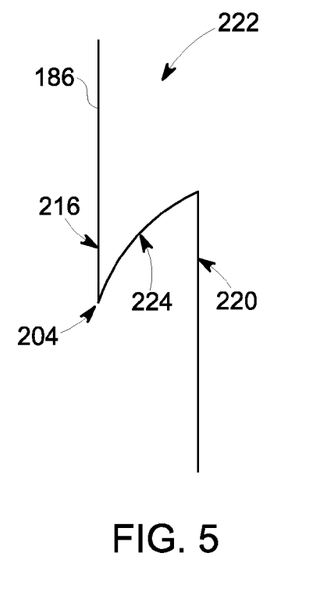
FIG. 5 is a cross-sectional view of an embodiment of an annular step having an arcuate portion.
Figure 6:
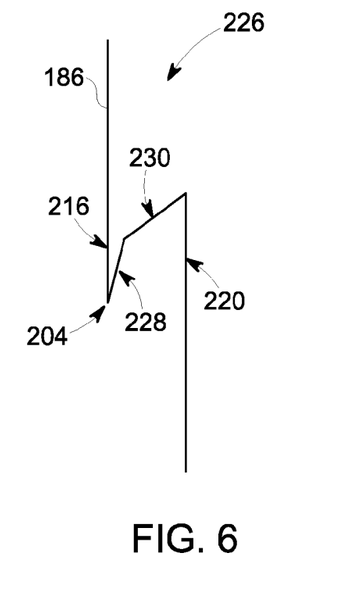
FIG. 6 is a cross-sectional view of an embodiment of an annular step having a multi-angled portion.

FIGS. 4-6 illustrate presently contemplated embodiments of the annular step and the drip point illustrated in FIG. 3, but the shown embodiments are not meant to limit the invention to the illustrated configurations. Indeed, any suitable annular step with one or more drip points having various dimensions and shapes may be employed in certain embodiments. Specifically, FIG. 4 is a partial cross-sectional view of the RSC 146 taken within line 4-4 of FIG. 3, illustrating one embodiment of the annular step 190. In this embodiment, the annular wall 186 upticks at dip point 204 such that wall portion 212 is disposed at a first angle 214 from wall portion 216 and at a second angle 218 from wall portion 220. The angles 214 and 218 may be dimensioned as appropriate for the given application to separate a high density flow stream from a mixed density flow stream. For example, in some embodiments, the angle 214 may be between approximately 5° and approximately 45°, though other angles may also be employed. For further example, the angle 214 may be between approximately 5° and approximately 70°.

FIG. 5 is a schematic illustrating an embodiment of an alternate annular step 222. In this embodiment, wall portion 216 terminates in drip point 204, which upticks to a curved or arcuate wall 224 disposed between wall portion 216 and wall portion 220. FIG. 6 is another schematic illustrating a further embodiment of the annular step 226. In this embodiment, the drip point 204 upticks to a first wall portion 228 that further upticks to a second wall portion 230 before terminating in wall portion 220. It should be noted that the embodiments of the annular step illustrated in FIGS. 4-6 are merely examples and are not intended to constrain or limit forms which the uptick and/or drip point may take. In particular, in other embodiments, any of a variety of annular steps with various dimensions and shapes may be employed to provide a drip point capable of separating a high density flow path from a mixed density flow path.

Figure 7:
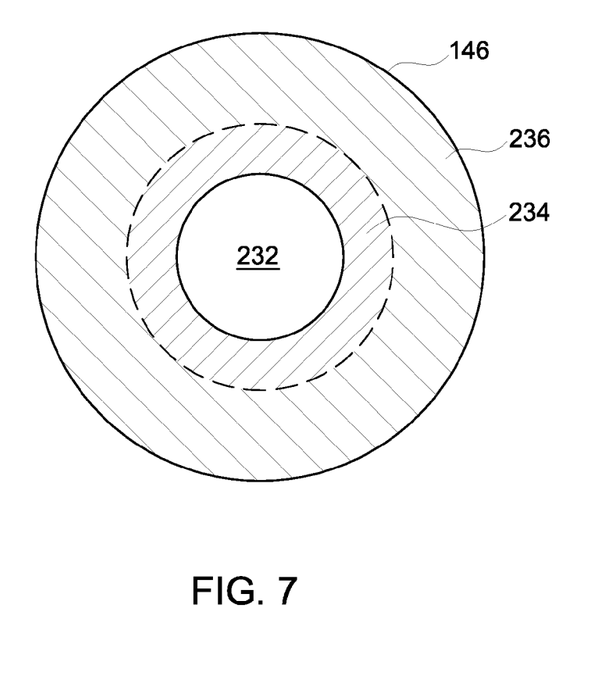
FIG. 7 is a cross-sectional top view of the RSC of FIG. 2, illustrating an embodiment of a high density fluid path established lengthwise through the RSC.

FIG. 7 is a cross-sectional top view of the RSC 146 of FIG. 2, illustrating an embodiment of a high density fluid path established lengthwise through the RSC 146. As shown, high density fluid flow is established in a substantially annular ring 232 in a center portion of the lengthwise flow through the RSC 146. In the illustrated embodiment, a zone 234 of empty space is established between the annular ring of flow 232 and an annular heat exchanger zone 236. That is, in some embodiments, the heat exchanger zone 236 in which heat exchanger tubing is positioned may be set off from the annular ring 232 of slag flow by zone 234. In such a way, the slag flow may be isolated from the heat exchanger tubing during lengthwise flow of the syngas and slag through the RSC 146. The isolation zone 234 may be dimensioned appropriately for the given application.

Figure 8:
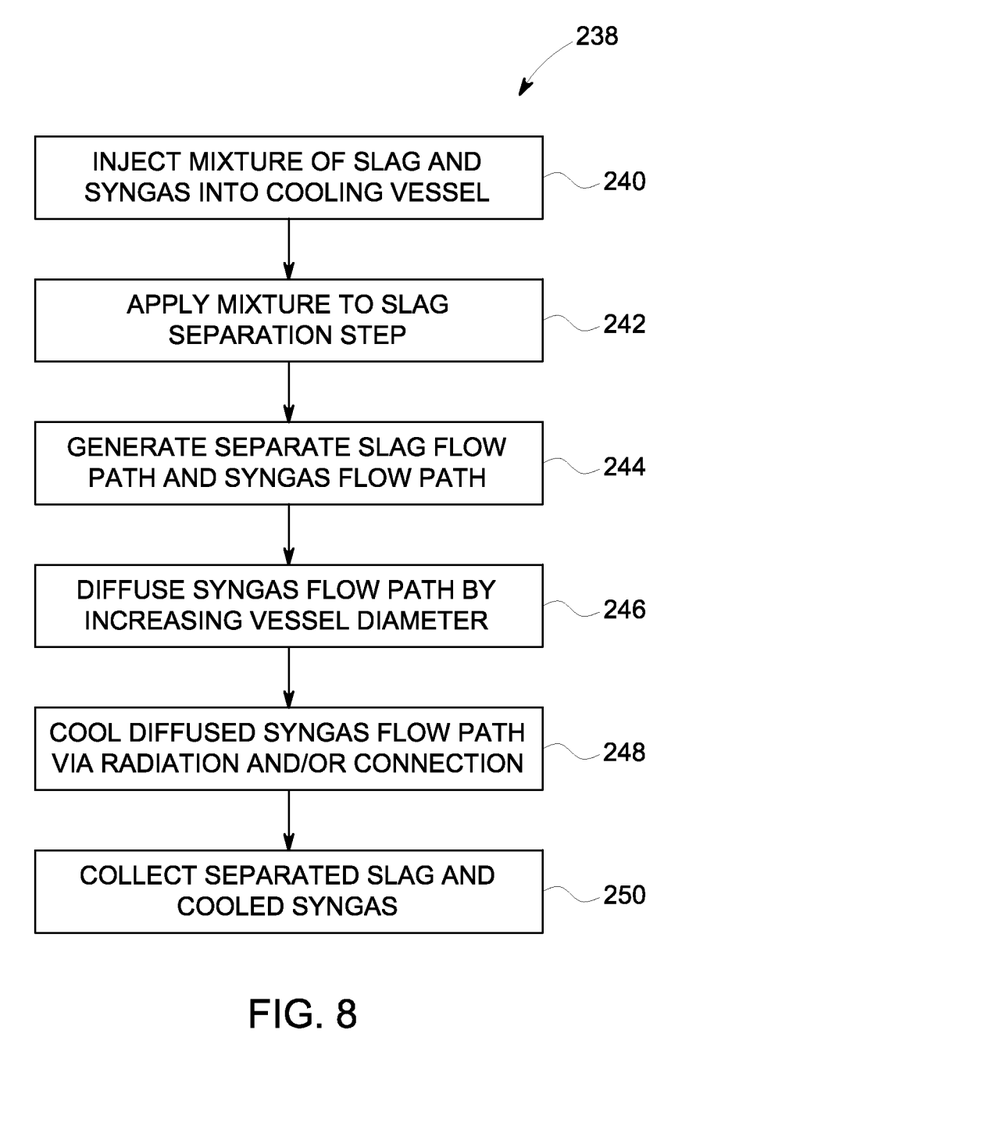
FIG. 8 illustrates a method of using the RSC of FIG. 2 in accordance with an embodiment of the present invention.

FIG. 8 illustrates an embodiment of a method 238 of using the RSC 146 of FIG. 2 to cool a syngas product of a gasifier. The method 238 includes injecting a mixture of slag and syngas into the cooling vessel (block 240) and applying the slag and syngas mixture to the slag separation step (block 242). The slag separation step is configured as a drip point that generates separate slag and syngas flow paths (block 244). The separated syngas flow path is diffused outward toward downstream heat exchanger tubing by increasing a diameter of the vessel downstream of the slag separation step (block 246). The method 238 further includes cooling the diffused syngas via radiation and/or convection (block 248), for example, via heat exchange between the syngas at an elevated temperature and a coolant flowing through the heat exchanger tubing at a lower temperature. After cooling of the syngas, the separated slag and cooled syngas are each collected (block 250) and routed from the RSC 146 to an appropriate secondary vessel.

A technical effect of embodiments of the invention includes the enabling separation of a high density flow path (e.g., a slag flow path) from a mixed density flow path (e.g., a slag and syngas mixture) in a gasification cooling system. Another technical effect of certain embodiments may be the diffusion of a syngas flow path upstream of heat exchanger tubing in a gasification cooling system. For example, some embodiments of the present invention may include an annular step configured to function as a drip point that separates a slag stream from a mixture of slag and syngas. The foregoing feature may facilitate decoupling of the syngas stream from the slag stream, thus enabling improved transfer of heat from the syngas to the heat exchanger tubing as the syngas flows through the cooling device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gasification cooling system, comprising:
a housing having an inlet, an outlet, and an interior region disposed between the inlet and the outlet; and
a throat disposed in the interior region adjacent the inlet and comprising an annular wall, wherein the annular wall comprises an annular step, a region of constant diameter disposed downstream of the annular step, and a tapered region of increasing diameter extending in a flow direction from the portion of the throat adjacent the inlet toward the outlet and disposed downstream of the region of constant diameter.

2. The gasification cooling system of claim 1, further comprising heat exchanger tubing disposed downstream of the throat in the flow direction inside of the housing.

3. The gasification cooling system of claim 1, wherein the annular step comprises a drip point configured to separate a slag stream from a mixture of slag and syngas in the flow direction.

4. The gasification cooling system of claim 1, wherein the region of constant diameter is configured to enable reattachment of a boundary layer of a syngas to a separated syngas stream in the flow direction.

5. The gasification cooling system of claim 1, wherein the tapered region of increasing diameter is configured to diffuse a syngas flow stream in the flow direction.

6. The gasification cooling system of claim 1, wherein the annular step comprises one or more discrete drip points disposed about a circumference of the annular wall, wherein slag is configured to flow toward each of the discrete drip points and to drip from each of the discrete drip points.

7. The gasification cooling system of claim 1, wherein the annular wall comprises one or more layers of refractory bricks configured to thermally insulate the interior region.

8. A gasification cooling system, comprising:
a housing comprising a fluid passage extending in a flow direction lengthwise along the housing;
an annular wall disposed about the fluid passage and comprising one or more annular steps; and
a plurality of heat exchanger tubes downstream of the one or more annular steps and configured to cool a syngas in the gas passage as the syngas flows in the flow direction, wherein the annular wall comprises a tapered region of increasing diameter in the flow direction disposed downstream of the one or more annular steps and upstream of the heat exchanger tubes.

9. The gasification cooling system of claim 8, wherein the one or more annular steps comprise an angled uptick in the annular wall.

10. The gasification cooling system of claim 9, wherein the angled uptick is between approximately 5° and approximately 70° from the annular wall.

11. The gasification cooling system of claim 8, wherein the one or more annular steps are configured as one or more drip points from which a slag stream is separated from a mixture of slag and syngas.

12. The gasification cooling system of claim 8, wherein the one or more annular steps are configured to receive a mixture of slag and syngas and to direct the slag from the mixture to fall in the flow direction in a substantially annular ring disposed in a center portion of the fluid passage.

13. The gasification cooling system of claim 8, wherein the annular wall further comprises a region of constant diameter downstream of the one or more annular steps.

14. The gasification system of claim 8, wherein the tapered region is configured to diffuse a syngas flow path substantially uniformly about the heat exchanger tubes.

15. A gasification cooling system, comprising:
- a housing having an inlet, an outlet, and a fluid passage disposed between the inlet and the outlet;
- a throat adjacent the inlet and having an annular wall disposed about the fluid passage; and
- one or more drip points circumferentially disposed about the annular wall and configured to separate a high density stream from a mixed density fluid stream flowing in a flow direction from the inlet toward the outlet, wherein the throat comprises a tapered region disposed downstream of the one or more drip points and increasing in diameter in the flow direction.

16. The gasification cooling system of claim 15, further comprising one or more heat exchanger tubes disposed downstream of the one or more drip points in the flow direction.

17. The gasification cooling system of claim 15, wherein the tapered region is configured to diffuse a low density stream separated from the mixed density fluid stream in the flow direction.

18. The gasification cooling system of claim 15, wherein the mixed density fluid comprises a mixture of slag and syngas, and the high density stream comprises a stream of slag.

19. A gasification cooling system, comprising:
- a housing comprising a fluid passage extending in a flow direction lengthwise along the housing;
- an annular wall disposed about the fluid passage and comprising one or more annular steps; and
- a plurality of heat exchanger tubes downstream of the one or more annular steps and configured to cool a syngas in the gas passage as the syngas flows in the flow direction, wherein the one or more annular steps comprise an angled uptick in the annular wall.

* * * * *